United States Patent
Takiyama et al.

[11] Patent Number: 5,264,466
[45] Date of Patent: Nov. 23, 1993

[54] STAINPROOFING PAINT COMPOSITION AND METHOD FOR PRODUCING SAME

[75] Inventors: Eiichiro Takiyama, Kamakura; Jun Hasegawa, Kumagaya, both of Japan

[73] Assignee: Showa Highpolymer Co., Ltd., Tokyo, Japan

[21] Appl. No.: 889,237

[22] Filed: May 28, 1992

[51] Int. Cl.$^5$ .......................... C08K 3/10; C08K 3/22; C08K 3/32
[52] U.S. Cl. ................................ 523/122; 523/177; 524/270; 524/322; 524/413; 524/414; 524/423; 524/425; 524/431; 524/440; 524/443; 526/316; 526/320; 526/324; 526/325
[58] Field of Search ................ 523/122, 177; 524/413, 524/431, 440, 322, 270, 414, 423, 425, 443; 526/316, 320

[56] References Cited

U.S. PATENT DOCUMENTS

| | | | |
|---|---|---|---|
| 4,270,953 | 6/1981 | Nakagawa et al. | 524/270 |
| 4,752,629 | 6/1988 | Proudlock et al. | 523/122 |
| 5,049,592 | 9/1991 | Kronstein | 524/413 |
| 5,194,142 | 3/1993 | Florester | 208/48 R |

*Primary Examiner*—Paul R. Michl
*Assistant Examiner*—Tae H. Yoon
*Attorney, Agent, or Firm*—Oblon, Spivak, McClelland, Maier & Neustadt

[57] ABSTRACT

Stainproofing paint composition employing concurrently
(A) a polymer having an acetoacetyl group; and
(B) an inorganic copper compound and/or copper.

The paint has excellent coating properties on materials. If immersed in sea, the paint exhibits superior stainproofing properties for prolonged periods of time because the paint regulates the solubilization rate of copper ions.

10 Claims, No Drawings

STAINPROOFING PAINT COMPOSITION AND METHOD FOR PRODUCING SAME

BACKGROUND OF THE INVENTION

1. Field of the Invention

The present invention relates to so-called stainproofing paint to prevent the deposition in sea water of marine organisms, such as shells and algae.

2. Description of the Related Art

It is very important to prevent the deposition of marine organisms to the bottoms of vessels or construction structure in sea water or the like, in view of efficient operation and maintenance thereof. As a preventive measure, paints containing organic tin have conventionally been used effectively. However, the accumulation of organic tin compounds mainly in fish has been drawing concern. From the viewpoint of public health, the use of such compounds as a stainproofing agent is likely to become more difficult. Instead of these organic tin paints, attention has been refocused again on the use of inorganic copper compounds, in particular cuprous oxide, which do not accumulate in fish and has been practically used conventionally.

As has been well known for some time, it is difficult for paints containing one of the typical inorganic copper compounds, namely, cuprous oxide, as the stainproofing agent, to have a so-called "eel paint"-like function, where a polymer such as triphenyltin methacrylate leaches out gradually from the surface.

Paints containing cuprous oxide as the stainproofing agent and rosin as the vehicle are severely damaged in marine water so they cannot function as paints with prolonged stainproofing action. It is also said that stainproofing paints using a chloride-rubber vehicle lose their stainproofing action if the cuprous oxide distributed on the surface is solubilized.

It has been shown that, in order for a coating containing cuprous oxide to exhibit stainproofing action, cuprous oxide should solubilize at 8-11 $\mu g/cm^2/day$. Therefore, for a stainproofing paint to function in a stable manner, this level must be maintained constant for a prolonged period of time.

Thus, a great deal of research has been directed toward obtaining a vehicle for paints, which contains the necessary amount of cuprous oxide and in which the coating film is consistently renewed so that a sufficient amount of cuprous oxide can be supplied.

Such vehicles include a monomer forming aqueous polymer, illustrated by one example wherein vinylpyrolidone is used as one component of a copolymer or by another example employing a monomer having a tertiary amino group.

However, stainproofing paints employing these known polymers as vehicles do not show the variation of the physical properties depending on the circumstances at use; in other words, the solubility of the polymers does not change over time.

A disposition such as observed in the "eel paint" is preferable; that is, a polymer containing cuprous oxide is renewed on the surface so as to consistently supply a constant amount of cuprous oxide.

The present inventors, as a result of pursuing their investigation of vehicles capable of releasing a sufficient amount of copper ion to exhibit stainproofing action for a prolonged period of time, using inorganic copper compounds such as cuprous oxide as a stainproofing agent, have found that this objective can be achieved by using a polymer having an acetoacetyl group as at least one component, to achieve the present invention.

SUMMARY OF THE INVENTION

A first aspect of the present invention relates to a stainproofing paint composition employing concurrently (A) a polymer having an acetoacetyl group; and
(B) an inorganic copper compound and/or copper.

A second aspect of the present invention relates to a stainproofing paint composition employing concurrently a polymer having an acetoacetyl group wherein the main chain of the polymer having the acetoacetyl group is a carbon-carbon bond and an inorganic copper compound and/or copper.

A third aspect of the present invention relates to a stainproofing paint composition employing concurrently a polymer having an acetoacetyl group and an inorganic copper compound and/or copper, wherein the polymer having an acetoacetyl group is obtained by copolymerizing (1) a monomer having an acetoacetyl group, and
(2) at least one monomer being copolymerizable with the above monomer and which forms a water-insoluble type polymer.

A fourth aspect of the present invention relates to a stainproofing paint composition employing concurrently a polymer having an acetoacetyl group and an inorganic copper compound and/or copper, wherein the polymer having an acetoacetyl group is obtained by copolymerizing (1) a monomer having an acetoacetyl group, and
(2) a water-soluble monomer, in combination or not in combination with
(3) a water-insoluble monomer, depending on need.

A fifth aspect of the present invention relates to a stainproofing paint composition employing concurrently a polymer having an acetoacetyl group and an inorganic copper compound and/or copper, further containing a resin or a fatty acid, having a molecular weight of less than 3,000 and containing one carboxyl group within the molecule.

A sixth aspect of the present invention relates to a method for preparing a stainproofing paint composition, comprising preliminarily mixing (a) an inorganic copper compound and/or copper, and
(b) a resin or a fatty acid, having a molecular weight of less than 3,000 and containing one carboxyl group within the molecule, and subsequently adding (c) a polymer having an acetoacetyl group to the resulting mixture.

DETAILED DESCRIPTION OF THE INVENTION

Although the mechanism of how the use of a polymer having an acetoacetyl group in combination with for example cuprous oxide, can bring about the release of a constant amount of copper ion is not exactly clear, it is presumed that there is some relation to the facts of the formation of chelate bonding between the acetoacetyl group and such copper compounds, the regeneration of hydroxyl group due to the acceleration of the hydrolysis of the acetoacetyl group in aqueous alkaline solution, and the increase in the solubility in water of the polymer following the regeneration.

The polymer having an acetoacetyl group to be used in the present invention can be synthesized by:

(1) polymerization of a monomer having an acetoacetyl group; or
(2) reaction of a diketene with a polymer having a hydroxyl group at the side chain. Representative examples of the reaction are shown as follows;

Method of (1)

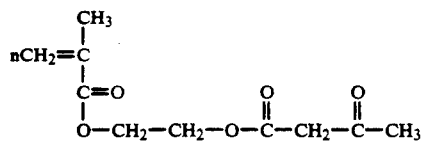

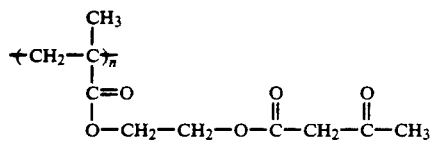

Method of (2)

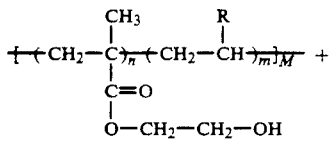

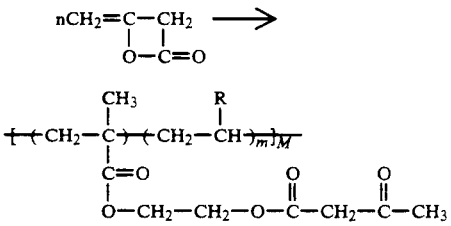

(Polymer having an acetoacetyl group)

The polymer having an acetoacetyl group, described above, can be synthesized in the form of a homopolymer of a monomer having an acetoacetyl group, or a copolymer with a comonomer copolymerizable with the above monomer, both of which can be used in the present invention.

As is well known, an acetoacetyl group shows typical keto-enol tautomerism, which is depicted in the following;

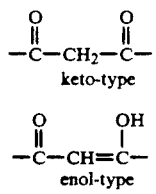

Thus, the keto-enol tautomerism may possibly be involved in the homopolymerization of a monomer having an acetoacetyl group. However, caution should be paid so as to use a greater amount of polymerization adjusting agent, because an increase in the polymerization rate rapidly causes gelation.

The monomer having an acetoacetyl group to be used in the method of (1) of the present invention, includes a compound containing a radically polymerizable unsaturated group and acetoacetyl group. Preferable examples thereof are illustrated by the following reaction products of unsaturated alcohols and diketene; preference is given to 2-hydroxyethyl acrylate, 2-hydroxypropyl acrylate, 2-hydroxyethyl methacrylate, 2-hydroxypropyl methacrylate, 2-hydroxyphenyl methacrylate, polyethylene glycol monomethacrylate, allyl alcohol and the like. Additionally, monomers having terminal hydroxyl group may be used, in which 1 to 20, preferably 1 to 5 alkylene oxide or caprolactone is added to an unsaturated alcohol simultaneously containing (metha)acryloyl group produced by reacting polyhydric alcohol and (metha)acrylic acid, as well as allyl alcohol.

Although the terminal hydroxyl group is satisfactorily a primary one in accordance with the present invention because it can be easily modified into acetyl acetonate, a secondary-type hydroxyl group may be used as well, if suitable conditions are selected.

The comonomer copolymerizable with the monomer having an acetoacetyl group is not specifically limited, but includes for example, styrene, vinyl toluene, chlorostyrene, methyl methacrylate and methacrylate ester, acrylate ester, acrylonitrile, methacrylonitrile, vinyl acetate, vinyl chloride, vinylpyrrolidone, acrylamide, butadiene, isoprene and the like.

In accordance with the present invention, it has been shown that, if a monomer having an acetoacetyl group is polymerized, the gelation can be reduced by copolymerizing monomers, copolymerizable with the above monomer and capable of forming a water-insoluble polymer.

The types of these monomers are illustrated by the fact that the polymers formed with the monomers are water insoluble, including the following types; styrene, vinyl toluene, methyl methacrylate, ethyl methacrylate, isopropyl methacrylate, n-butyl methacrylate, isobutyl methacrylate, t-butyl methacrylate, cyclohexyl methacrylate, 2-ethylhexyl methacrylate, benzyl methacrylate, ethyl acrylate, butyl acrylate, 2-ethylhexyl acrylate, acrylonitrile, methacrylonitrile, vinyl acetate and the like.

The ratio of monomers each having an acetoacetyl group to the monomer copolymerizable with the monomers is 99 mol % to 20 mol % as the amount of monomers having an acetoacetyl group. If less than 20 mol %, the desired stainproofing effect will be hard to produce because of the decrease in the flow rate of copper ions, provided that the monomer concurrently used is water-insoluble. The ratio is more appropriately in a range of 95 mol % or less to 50 mol % or more.

Various routine methods for polymerization may be applied to the present polymerization. However, if the ratio of the monomers having an acetoacetyl group is 50 mol % or more, a chain transfer agent, typically mercaptans, may be used at 1% or more by weight appropriately so as to prevent an increase in the viscosity at the late phase of the polymerization.

In the polymerization of a monomer having an acetoacetyl group, the increase in the polymerization rate promotes rapid gelation, which makes the generation of a stable polymer difficult. However, it has been found that such defect can be modified by concurrent use of a monomer without an acetoacetyl group.

If a water-soluble type of monomer is used as such monomer component, the amount of solubilized copper ions can be controlled, depending on the ratio of the monomer used.

If a greater amount of a water-soluble monomer is used, copper ions rapidly solubilize initially, although the change of the solubilization rate over time is larger. Therefore, the required ion concentration is unlikely to be retained for the desired number of days. In contrast, the use of water-insoluble monomers shows a reverse tendency.

Thus, a desired long term release of copper-ions can be expected if a monomer having an acetoacetyl group is employed as the principal component, the amount of a water-soluble monomer is controlled, and a water-insoluble monomer is added as a third component according to need.

The water-soluble monomer to be copolymerized with the monomers having an acetoacetyl group so as to form a vehicle for stainproofing paint can be illustrated as follows; vinylpyrrolidone, acrylic acid, methacrylic acid, methylol acrylamide, acrylamide, 2-hydroxyethyl acrylate, 2-hydroxyethyl methacrylate, 2-hydroxypropyl acrylate, 2-hydroxypropyl methacrylate, monomers capable of forming tetra-ammonium salt, typically, the addition product of an unsaturated tertiary amine dimethylaminoethyl methacrylate and benzyl chloride, and the like.

If it is necessary to enlarge the range of physical properties, the concurrent use of monomers producing water-insoluble polymers, such as styrene, vinyl toluene, methacrylate esters, acrylate esters, vinyl acetate acrylonitrile, and methacrylonitrile is useful.

The ratio of a water-soluble monomer is 1 to 70 mol %, preferably 5 to 50 mol % relative to 99 to 30 mol % of a monomer having an acetoacetyl group.

As the polymer to be used in method (2) of the present invention having an hydroxyl group at the side chain thereof, saponified products of copolymers such as polyvinyl acetate and ethylene/vinyl acetate copolymer in addition to (co)polymers having a hydroxyl group at the side chain thereof obtained by polymerization of monomers having hydroxyl group or copolymerization of the monomers with other monomers, or the polymers having a hydroxyl group obtained by the modification of the saponified product, such as acetal, formal, butylal polymers thereof are included.

Preferable examples of the monomers having a hydroxyl group include the unsaturated alcohol described in the method of (1). The other monomers similarly include the comonomers described above.

The hydroxyl group and diketene are reacted together in a sealed vessel at a temperature around 60° C. in presence of a catalyst such as an organic tin compound, tertiary amine and the like.

As the polymer containing an acetoacetyl group to be used in the present invention, preference is given to those having a number average molecular weight of 5,000 to 100,000, preferably about 8,000 to 50,000, from the viewpoint of operability and copper-ion releasing rate. The ratio of the acetoacetyl group present in the polymer is 1 to 50%, preferably 3 to 30% by molar fraction. Within this range, the polymer is very stable with cuprous oxide.

Typically, cuprous oxide is representative of the inorganic copper compounds to be used in the present invention and satisfactory enough for the objectives of the present invention. Additionally, there may be illustrated basic copper chloride, basic copper sulfate, copper carbonate, basic copper carbonate, basic copper phosphate, copper hydroxide, copper silicate and the like. Such compounds may be used in an amount of 10 to 200 parts by weight to 100 parts by weight of the resin.

If the stainproofing paint containing a polymer having an acetoacetyl group as the vehicle is concurrently used and mixed with inorganic copper compounds such as cuprous oxide, as has been described above, the paint will remain in a state applicable for coating for several days, but the paint will sometimes gel before too long. It has been found that, a multi-component copolymer containing a carboxyl group and/or hydroxyl group (these are referred to as reactive functional groups, including acetoacetyl group), in particular, will turn into a gel in several minutes, in extreme cases. Therefore, it is desirable to increase pot life of these stainproofing paints as much as possible, so as to improve their operability.

The present inventors have carried out investigations with the objective of realizing the condition wherein the multi-component polymers having these reactive groups are mixed with copper compounds represented by cuprous oxide for a sufficiently long period of time. It has been found unexpectedly that, if a compound having one carboxyl group, represented by rosin, is thoroughly mixed and kneaded with cuprous oxide and the kneaded mixture is subsequently added to the polymer having an a reactive functional group, a state of gelation does not immediately develop. Thus, another objective of the present invention can be achieved.

Although rosin is a representative example of a compound having one carboxyl group, components that may be used in the same manner as rosin, in accordance with the present invention, are oligomers having substantially one carboxyl group within a molecule, with a molecular weight of 3,000 or less, that is an unsaturated hydrocarbon type oligomer to which can be added maleic anhydride or an unsaturated hydrocarbon type oligomer to which can be added maleic anhydride wherein the acid anhydride group is monoesterified with a desired alcohol. Examples of such oligomers include fatty acids of the hydrolyzed components of natural fats and oils of C12 or more, or monoesters of terpene with maleic anhydride added, monoesters of petroleum resin with maleic anhydride added, monoesters of butadiene oligomer with maleic anhydride added, and the like.

The reason why the molecular weight is defined as 3,000 is that the molecular weight that limits the compatibility with such a polymer is around this figure. If a product comes to have a higher molecular weight than this figure, the stabilizing effect of the oligomer may, depending on the structure, of course, deteriorate when the kneaded product and cuprous oxide are added to the polymer.

The most preferable molecular weight of the oligomer having one carboxyl group is 200 or more to 1,500 or less.

The stainproofing paint composition of such type can be obtained by concurrently using (a) an inorganic copper compound and/or copper;

(b) a resin or a fatty acid, having a molecular weight of less than 3,000 containing one carboxyl group within the molecule; and (c) a polymer having an acetoacetyl group.

Gelation may develop as a problem when the stainproofing paint composition is not used immediately after the preparation but let to stand for some time. That is, early gelation may occur when rosin is preliminarily added to a polymer having an a reactive functional group, followed by further addition of cuprous oxide.

However, if rosin and cuprous oxide are preliminarily kneaded and mixed together leading to the resulting mixture in a state with a higher viscosity, it will be hard for gelation to develop even if the mixed system is added to the polymer having an such reactive group.

Practically, rosin is in the form of being dissolved in solvents, which is the case with the polymer.

According to the present invention, the concurrent use of known stainproofing agents, for example, copper dithiocarbamate in addition to the copper compounds is not prohibited.

It is needless to say that, coloring agents, fillers and solvents can be also used, if necessary, in the stainproofing paint composition of the present invention.

DESCRIPTION OF PREFERRED EMBODIMENTS

Methods of the present invention are illustrated with reference to the following examples, but the invention is not intended to be limited only to these following examples.

EXAMPLE 1

Synthesis of polymer A containing acetoacetyl group

In a 1-liter separable flask with an agitator, a reflux condenser, a thermometer and a gas inlet were charged 320 g of 2-acetoacetylethyl methacrylate, 320 g of methyl ethyl ketone, 10 g of t-butyl lauryl mercaptan, and 3 g of azobis-isobutylonitrile for the polymerization in a nitrogen stream at 60° to 65° C. for eight hours, followed by further addition of 1.5 g of azobisisobutylonitrile for further polymerization for 12 hours. The polymerization rate was 92%.

Polymer A containing an acetoacetyl group and having a number average molecular weight of 38,000 (in methyl ethyl ketone solution) was obtained in slightly yellowish liquid.

One hundred parts by weight (abbreviated to parts, hereafter) of cuprous oxide and 10 parts of methyl ethyl ketone were mixed and kneaded with 100 parts of the polymer A to prepare a stainproofing paint (I) in paste. The viscosity of the paint increased two days later, so the paint could barely be applied for coating. On the day of the kneading and mixing process, the paint could be diluted further with a solvent for spray coating.

The back surface of a Bonderite steel board was processed with back coating with an epoxy resin paint, whereas the front surface was coated with the stainproofing paint (I) to a dry film thickness of about 70 μm.

During an accelerated solubilization test using an accelerated leaching solution containing glycine (at an acceleration ratio of 20 fold), the amount of initial solubilization was 105 μg/cm$^2$/day. After 360, 430 and 600 days passed, the amount of solubilization was in a range of 45 to 42 μg/cm$^2$/day, which was almost constant after 360 days passed.

EXAMPLE 2

Synthesis of polymer B containing acetoacetyl group (allyl acetoacetate/vinyl acetate)

In a 1-liter separable flask with an agitator, a reflux condenser, a thermometer and a gas inlet were charged 288 g of allyl acetoacetate, 172 g of vinyl acetate, 340 g of methyl ethyl ketone and 5 g of benzoyl peroxide for the polymerization in a nitrogen stream under the reflux with methyl ethyl ketone for 12 hours.

Polymer B containing an acetoacetyl group and having a number average molecular weight of about 8,000 was obtained at a polymerization rate of 87%. Thorough mixing and kneading was effected on 100 parts of the polymer B, 150 parts of cuprous oxide, 50 parts of basic copper carbonate and 30 parts of toluene to prepare a stainproofing paint (II). As in Example 1, the coating with the paint (II) was then effected three times on a Bonderite copper board through the back-surface process, to a dry film thickness of 70 to 80 μm.

As in Example 1, solubilization of the dry film was accelerated. Consequently, the amount of solubilized copper ions immediately after the coating was 124 μg/cm$^2$/day. After 360 days, the amount was almost constant at 38 to 40 μg/cm$^2$/day.

EXAMPLE 3

Stainproofing test

On a 6-mm thick slate board cut to a size of 30 cm×30 cm was spray coated "SPRAY DUM #500" manufactured by Showa Kobunshi, Co. Ltd., to a thickness of about 2 mm. After curing, the stainproofing paints (I) and (II), prepared in Examples 1 and 2, respectively, were coated and dried to a film thickness of 70 to 100 μm, which were used as test pieces for immersion. An uncoated slate board as a reference sample was transferred and immersed at a depth of 0.5 m in sea water during ebb tide from the end of March to the end of October.

A great number of algae and shells along with barnacles had deposited on the uncoated slate board to completely cover the base, whereas almost no deposition of shells were observed on the surfaces coated separately with the stainproofing paints (I) and (II).

EXAMPLE 4

Synthesis of copolymer C (2-acetoacetylethyl methacrylate/styrene)

In a 1-liter separable flask with an agitator, a reflux condenser, a thermometer and a gas inlet were charged 340 g of 2-acetoacetylethyl methacrylate, 40 g of styrene, 320 g of methyl ethyl ketone, 2 g of azobis-isobutylonitrile, and 3.8 g of lauryl mercaptan for the polymerization in a nitrogen stream at 65° to 70° C. for eight hours. During that time, 0.7 g of azobisisobutylonitrile was further added every two hours.

At a polymerization rate of about 92%, there was produced copolymer C of 2-acetoacetylethyl methacrylate (80 mol %) and styrene (20 mol %), having a number average molecular weight of 54,000.

The color of the copolymer was pale yellow, and the viscosity thereof was about 90 poise.

Preparation of stainproofing paint (III)

Thorough mixing and kneading was effected on 100 parts of the copolymer C, 30 parts of methyl ethyl ketone and 110 parts of cuprous oxide to prepare a stainproofing paint (III).

The kneaded mixture stored in a sealed container was capable of being coating for about 2 days.

A Bonderite steel board that had been corrosion resistant coated with an epoxy resin was coated with the paint (III) to a dry film thickness of about 70 to 100 μm, prior to drying.

There was obtained a film having a pencil hardness of 2H and a cross-cut adhesion test of 100/100.

Copper ion solubilization test

A leaching test for copper ion solubilization was carried out on the coated samples based on the Rechum method using a glycine solution.

A solution was used, which was adjusted to pH 10.5 and comprised;

| | |
|---|---|
| glycine | 1.785 g |
| sodium chloride | 27.960 g |
| 0.1% sodium hydroxide | 28.8 cc |
| distilled water | 1000 cc. |

Although the acceleration ratio is generally considered to be 20 to 30 fold, calculation was done herein assuming the ratio to be 20 fold.

For the first three days after the initiation of the test (corresponding to 60 days), the amount of solubilized copper ions was 94 $\mu g/cm^2$/day on average, and then decreased to 41 $\mu g/cm^2$/day on the day corresponding to 360 days. The amount was kept constant at 39 to 41 $\mu g/cm^2$/day thereafter until equivalent of 720 days.

EXAMPLE 5

Synthesis of copolymer D

In a 1-liter separable flask with an agitator, a reflux condenser, a thermometer and a gas inlet were charged 240 g of 2-acetoacetylethyl acrylate, 55 g of butyl acrylate, 10 g of acrylonitrile, 295 g of toluene, 2 g of t-butyl lauryl mercaptan, and 3 g of azobis-isobutylonitrile for the polymerization in a nitrogen stream at 70° to 75° C. for 16 hours. Four hours and eight hours later, intermediately, 1.5 g of azobisisobutylonitrile was further added.

The polymerization rate was about 93%, and the number average molecular weight was 64,000.

Copolymer D colored pale yellow was produced, having a viscosity of about 40 poise.

Preparation of stainproofing paint (IV)

Fifty parts of basic copper carbonate, 50 parts of copper powder, and 50 parts of cuprous oxide were thoroughly mixed and kneaded together with 100 parts of the copolymer D to prepare a stainproofing paint (IV).

A Bonderite steel board was coated using the same process as in Example 4 with the paint (IV) three times to a dry film thickness of 70 to 100 $\mu m$, to prepare a dry film.

The surface of the film was not viscous. The film had a pencil hardness of F and a cross-cut adhesion test of 100/100.

As in Example 4, an acceleration test was done. The acceleration ratio for the first three days showed variation in a range of 59 to 91 $\mu g/cm^2$/day, but it was 39 $\mu g/cm^2$/day on the day corresponding to 360 days, and 27 $\mu g/cm^2$/day on the day corresponding to 720 days.

EXAMPLE 6

Synthesis of copolymer E

In a 1-liter separable flask with an agitator, a reflux condenser, a dropping funnel, a thermometer with a gas inlet were charged 62 g of styrene, 182 g of 2-hydroxyethyl methacrylate, 1.5 g of t-butyl lauryl mercaptan, 2.5 g of azobisisobutylonitrile, and 170 g of ethyl acetate for the polymerization in a nitrogen stream at 70° to 75° C. for 16 hours.

During that time, 1.5 g of azobis-isobutylonitrile was further added two times every four hours.

At a polymerization rate of about 95%, there was produced a polymer having an a number average molecular weight of about 69,000.

The temperature was then lowered to 60° C. To the polymer was added 1 g of dibutyltin dilaurate, followed by dropwise addition of 90 g of diketene over about one hour. After the completion of the addition, the mixture was left to stand at 60° C. for six hours. The result of infrared analysis indicated that about 70% of the hydroxyl group was acetoacetylated.

The polymer obtained was considered to correspond to a multi-component copolymer composed of about 50 mol % of 2-acetoacetylethyl methacrylate, 30 mol % of styrene and about 20 mol % of 2-hydroxyethyl methacrylate.

The copolymer E was obtained in pale yellowish brown and in syrup form.

Preparation of stainproofing paint (V)

Thorough mixing and kneading was effected on 100 parts of the copolymer E, 30 parts of methyl isobutyl ketone, 50 parts of copper powder and 90 parts of cuprous oxide to prepare a stainproofing paint (V) in paste.

The kneaded mixture was capable of being coating on the day of the preparation.

The sample was coated on a Bonderite steel board processed as in Example 4, to a dry film thickness of 70 to 100 $\mu m$. The film hardness was 2 to 3H and the cross-cut adhesion test was 100/100.

The same promotion test as in Example 4 was carried out on the sample.

For the first three days after the initiation of the test, the amount of solubilized copper ion was 104 to 89 $\mu g/cm^2$/day. On the day corresponding to 360 days, it was 53 $\mu g/cm^2$/day and on the day corresponding to 720 days, it was 39 $\mu g/cm^2$/day.

EXAMPLE 7

Stainproofing test

On a 6-mm thick slate board cut to a size of 30 cm×20 cm was spray coated "SPRAY DUM #500" manufactured by Showa Highpolymer, Co. Ltd., to a thickness of about 2 mm. After curing, the stainproofing paints (III), (IV) and (V) were coated three times thereon separately and dried to a film thickness of 70 to 100 $\mu m$, respectively.

These boards were immersed at a depth of 1 m in sea water for seven months from April to October. Slight deposition of algae like green laver was observed, without any deposition of shells.

However, a vast amount of barnacles and other shells were deposited enough to nearly cover the base of an unprocessed slate board of the same size, immersed at the same place at the same period of time.

EXAMPLE 8

Synthesis of copolymer F

In a 1-liter separable flask with an agitator, a reflux condenser, a thermometer and a gas inlet were charged 342 g of 2-acetoacetylethyl methacrylate, 44 g of vinylpyrrolidone, 324 g of methyl ethyl ketone, 4 g of azobis-isobutylonitrile, and 4 g of t-butyl lauryl mercaptan for the polymerization in a nitrogen stream at 70° to 75° C. for eight hours. Four hours later, intermediately, 2 g of azobis-isobutylonitrile was further added.

At a polymerization rate of about 91%, there was produced copolymer F in pale yellow and having a number average molecular weight of about 110,000 and a viscosity of about 113 poise.

Preparation of stainproofing paint (VI)

Thorough mixing and kneading was effected on 100 parts of the copolymer F, 110 parts of cuprous oxide, and 20 parts of methyl isobutyl ketone, to prepare a stainproofing paint (VI).

The paint was coated three times on a Bonderite steel board having the surface processed with anti-corrosion coating with a polyamide-cured epoxy resin, to a dry film thickness of 70 to 100 μm, to prepare a dry film.

The dry film had a pencil hardness of 2 H and a cross-cut adhesion test of 100/100.

Copper ion solubilization test

Leaching tests for copper ion solubilization were carried out on the coated samples, according to Re-chum's method using a glycine solution.

The solution used was adjusted to pH 10.5 and comprised;

| | |
|---|---|
| glycine | 1.785 g |
| sodium chloride | 27.960 g |
| 0.1% sodium hydroxide | 28.8 cc |
| distilled water | 1000 cc. |

Although the acceleration ratio is generally considered to be 20 to 30 fold, calculation was done herein assuming the ratio to be 20 fold.

For the first three days after the initiation of the test (corresponding to 60 days), the amount of solubilized copper ions was 104 μg/cm$^2$/day on average, and then decreased to 38 μg/cm$^2$/day on the day corresponding to 360 days. Thereafter, the amount was more or less decreased to 27 μg/cm$^2$/day on the day corresponding to 720 days, but exceeded the baseline value of 10 μg/cm$^2$/day.

EXAMPLE 9

Synthesis of copolymer G

In a 1-liter separable flask with an agitator, a reflux condenser, a gas inlet and a thermometer were charged 200 g of 2-acetoacetylethyl acrylate, 62 g of 2-vinyl pyridine, 42 g of styrene, 296 g of ethyl acetate, 3 g of t-butyl lauryl mercaptan, and 3 g of azobis-isobutyloni-trile for the polymerization in a nitrogen stream at 70° to 75° C. for 12 hours. Intermediately, 1.5 g of azobis-isobutylonitrile was further added two times every 4 hours.

A copolymer having a number average molecular weight of 69,000 was obtained at a polymerization rate of 96%.

To the copolymer was added 76 g of benzyl chloride, followed by addition of benzyl pyridium chloride-type tetra-ammonium salt, to produce a pale yellowish brown copolymer G of the aqueous monomers, at a viscosity of about 60 poise.

Preparation of stainproofing paint (VII)

Thirty parts of basic copper carbonate, 30 parts of copper powder, 50 parts of cuprous oxide and 20 parts of methyl isobutyl ketone was added to 100 parts of the copolymer G to prepare a homogeneous paint in paste. On the Bonderite steel board prepared as in Example 8, was coated the paint, three times, to a dry film thickness of 70 to 100 μm.

The film had a hardness of 2 to 3H and a cross-cut adhesion test of 100/100.

As in Example 8, the same solubilization test of copper ion was effected on the film.

The solubilized amount for the first three days showed variation in a range of 81 to 101 μg/cm$^2$/day, but it was 60 μg/cm$^2$/day on the day corresponding to 360 days, and 38 μg/cm$^2$/day on the day corresponding to 720 days.

EXAMPLE 10

Synthesis of copolymer H

In a 1-liter separable flask with an agitator, a reflux condenser, a dropping funnel, a thermometer with a gas inlet were charged 41 g of styrene, 208 g of 2-hydroxyethyl methacrylate, 1.5 g of t-butyl lauryl mercaptan, 2.5 g of azobis-isobutylonitrile, and 250 g of ethyl acetate for the polymerization in a nitrogen stream at 70° to 75° C. for 16 hours.

During that time, 1.5 g of azobis-isobutylonitrile was further added two times every four hours.

At a polymerization rate of about 96%, there was produced a copolymer having an a number average molecular weight of about 70,000.

The temperature was then lowered to 60° C. To the copolymer was added 1 g of dibutyltin dilaurate, followed by dropwise addition of 90 g of diketene over about one hour. After the completion of the addition, the mixture was left to stand at 60° C. for six hours. The result of infrared analysis indicated that about 70% of the hydroxyl group was acetoacetylated.

The copolymer H was obtained in a pale yellowish brown syrup form.

The copolymer obtained was considered to correspond to a multi-component copolymer composed of about 50 mol % of 2-acetoacetylethyl methacrylate, 20 mol % of styrene and about 30 mol % of 2-hydroxyethyl methacrylate.

Preparation of stainproofing paint (VIII)

Thorough mixing and kneading was effected on 100 parts of the copolymer H, 30 parts of methyl isobutyl ketone, 50 parts of copper powder and 90 parts of cuprous oxide to prepare a stainproofing paint (VIII) in paste.

The kneaded mixture was capable of being coated on the day of preparation.

The sample was coated on a Bonderite steel board processed as in Example 8, to a dry film thickness of 70 to 100 μm. The film hardness was 2 to 3 H and the cross-cut adhesion test was 100/100.

The same promotion test as in Example 8 was carried out on the sample.

For the first three days after the initiation of the test, the amount of solubilized copper ions showed variations in a range of 113 to 82 μg/cm$^2$/day. On the day corresponding to 360 days, it was 48 μg/cm$^2$/day, and then on the day corresponding to 720 days, it was 32 μg/cm$^2$/day.

EXAMPLE 11

On a 6-mm thick slate board cut to a size of 30 cm×30 cm was spray coated "SPRAY DUM #500" manufactured by Showa Highpolymer, Co. Ltd., at a thickness of about 2 mm. After curing, the stainproofing paints (VI), (VII) and (VIII) were coated three times thereon separately and dried to a film thickness of 70 to 100 μm, respectively.

These boards were immersed at a depth of 1 m in sea water for seven months from April to October. Slight deposition of algae like green laver was observed, without any deposition of shells.

However, a vast amount of barnacles and other shells were deposited to nearly cover the base on an uncoated slate board of the same size, immersed at the same place at the same time period.

EXAMPLE 12

Synthesis of copolymer J

In a 1-liter separable flask with an agitator, a reflux condenser, a thermometer and a gas inlet were charged 300 g of 2-acetoacetylethyl methacrylate, 57 g of isobutyl methacrylate, 14 g of acrylic acid, 3 g of t-butyl lauryl mercaptane, 3 g of azobis-isobutylonitrile and 330 g of ethyl acetate for the polymerization in a nitrogen stream at 65° to 70° C. for 12 hours.

Intermediately, 1.5 g of azobis-isobutylonitrile was further added two times every four hours.

At a polymerization rate of about 95%, there was produced multi-component copolymer J in pale yellow and having a number average molecular weight of about 68,000.

Preparation of kneaded product of rosin and cuprous oxide

Three hundred grams of WW-grade wood rosin (MW; about 340 to 350) were dissolved in 300 g of toluene, followed by mixing with 2,200 g of cuprous oxide in a sealed mixer, to prepare a kneaded product (a) in paste.

The kneaded product (a) was stable and maintained the fluid state as long as the product was kept in a sealed container.

With one hundred parts of polymer J were mixed 135 parts of the kneaded product (a), and 15 parts of toluene, to prepare a mixed paint (IX). The mixed paint was stable and capable of being coated for more than one week.

Alternatively, the product prepared by mixing 60 parts of 50% toluene solution of rosin, and 150 parts of cuprous oxide with 100 parts of the copolymer J turned into a gel about 10 minutes after the mixing.

On a Bonderite steel board having the back surface processed with an anti-corrosion coating using an epoxy resin was coated the mixed paint (IX) of the polymer J and the kneaded product (a), to a dry film thickness of about 70 to 100 μm, prior to drying.

The film was obtained, having a pencil hardness of 2H to 3H and a cross-cut adhesion test of 100/100.

Copper ion solubilization test

A leaching test for copper ion solubilization was carried out on the coated sample, according to the Rechum method using a glycine solution. That is, there was employed a solution adjusted to pH 10.5 and comprising;

| | |
|---|---|
| glycine | 1.785 g |
| sodium chloride | 27.960 g |
| 0.1% sodium hydroxide | 28.8 cc |
| distilled water | 1000 cc. |

Although the acceleration ratio is generally considered to be 20 to 30 fold, calculation was done herein assuming the ratio to be 20 fold.

For the first three days after the initiation of the test (corresponding to 60 days), the amount of solubilized copper ions showed variation in a range of 103 μg/cm$^2$/day to 84 μg/cm$^2$/day on average, and decreased to 43 μg/cm$^2$/day on the day corresponding to 360 days. The amount was thereafter almost constant, and it was at 37 μg/cm$^2$/day on the day corresponding to 760 days.

EXAMPLE 13

Synthesis of copolymer K

In a 1-liter separable flask with an agitator, a reflux condenser, a thermometer and a gas inlet were charged 200 g of 2-acetoacetylethyl acrylate, 62 g of 2-vinyl pyridine, 42 g of styrene, 296 g of ethyl acetate, 3 g of t-butyl lauryl mercaptan, and 3 g of azobis-isobutylonitrile for the polymerization in a nitrogen stream at 70° to 75° C. for 12 hours. Intermediately, 1.5 g of azobis-isobutylonitrile was further added two times every four hours.

A copolymer was obtained, at a polymerization rate of 96%, having a number average molecular weight of 69,000.

To the copolymer was added 76 g of benzyl chloride, followed by addition of benzyl pyridium chloride-type tetra-ammonium salt, to produce the pale-yellow copolymer K of the aqueous monomers, at a viscosity of about 60 poise.

Preparation of kneaded product (b) of cuprous oxide and tall oil fatty acid

One hundred fifty parts of "Hatall FA-1" (MW; about 300) manufactured by Harima Kasei Co. Ltd. were dissolved in 150 parts of toluene, followed by addition under stirring of 1,000 parts of cuprous oxide in a mixer, to prepare a kneaded product (b) in paste.

The kneaded product (b) was stable in a sealed container for more than one week.

The product, prepared by mixing 100 parts of polymer K and 130 parts of the kneaded product (b) and leaving the resulting mixture to stand one week after the kneading process, was capable of being coated without gelation if left to stand thereafter for more than one week. However, the product prepared by mixing 80 parts of cuprous oxide with 100 parts of the polymer K increased in viscosity 3 days later, and could barely be applied for coating. Alternatively, the product which was prepared by adding 15 parts of tall oil fatty acid to the polymer K and further adding and kneading 80 parts of cuprous oxide with the above mixture, was almost in the same state.

To 100 parts of the polymer K were added the kneaded product (b) and 20 parts of toluene to prepare a homogeneous solution, which was then coated two times onto a Bonderite steel board to a final dry film thickness of about 70 μm, prior to drying.

In order to prevent the development of rust on the back surface, "SPRAY DUM C-200" manufactured by Showa Highpolymer, Co. Ltd. was coated on the surface at about 2 mm thickness, to carry out the acceleration test as in Example 12.

Solubilization amount at the initiation of the test; 114 μg/cm²/day.

Solubilization amount on the day when 600 days passed; 31 μg/cm²/day.

As shown above, sufficient stainproofing effect was observed.

EXAMPLE 14

Synthesis of copolymer L

In a 1-liter separable flask with an agitator, a reflux condenser, a dropping funnel, a thermometer with a gas inlet were charged 41 g of styrene, 208 g of 2-hydroxyethyl methacrylate, 1.5 g of t-butyl lauryl mercaptan, 2.5 g of azobis-isobutylonitrile, and 250 g of ethyl acetate for the polymerization in a nitrogen stream at 70° to 75° C. for 16 hours.

During that time, 1.5 g of azobis-isobutylonitrile was further added two times every four hours.

The polymerization rate was about 96%, and the number average molecular weight was about 70,000.

The temperature was then lowered to 60° C. To the copolymer L was added 1 g of dibutyltin dilaurate, followed by dropwise addition of 90 g of diketene over about one hour. After the completion of the addition, the mixture was left to stand at 60° C. for six hours. The result of infrared analysis indicated that about 70% of the hydroxyl group was acetoacetylated.

The polymer obtained was considered to correspond to a multi-component copolymer composed of about 50 mol % of 2-acetoacetylethyl methacrylate, 20 mol % of styrene and about 30 mol % of 2-hydroxyethyl methacrylate.

The copolymer L was obtained in pale yellowish brown and in syrup form.

Preparation of kneaded product (c)

A mixture of 100 parts of monomethyl esterified addition product of α-terpinene-maleic anhydride (in 50% methyl ethyl ketone solution), 50 parts of cuprous oxide, 50 parts of basic copper carbonate, and 50 parts of copper powder was kneaded to prepare a kneaded product (c) in paste.

The kneaded product (c) was stable in a sealed state for more than one week, with no tendency of gelation.

One hundred parts of polymer L were mixed with 100 parts of the kneaded product (c) and 20 parts of methyl ethyl ketone, and the resulting mixture was coated at a thickness of about 70μ as in Example 13, prior to drying.

The mixed product of the polymer L and the kneaded product (c) increased in viscosity slightly but without gelation, so the product was stable and remained in such a state for more than one month.

The product prepared by mixing 50 parts of cuprous oxide, 50 parts of basic copper carbonate and 50 parts of copper powder with 100 parts of the polymer L was left to stand overnight, which was then turned into a gel state.

At the copper ion solubilization test of the coating film, the value of 113 μg/cm²/day at the initiation of the acceleration test changed into 27 μg/cm²/day on the day corresponding to 480 days.

EXAMPLE 15

On 30 cm×30 cm×0.5 cm slate boards was spray coated "SPRAY DUM C-500" manufactured by Showa Highpolymer, Co. Ltd., to a thickness of about 2 mm. After curing, the mixed products of each polymer with kneaded products, prepared in Examples 12, 13 and 14, were coated individually to a film thickness of about 70 to 100 μm. After drying, these boards were immersed at a depth of 1 m in sea water during ebb tide for seven months from April to October for carrying out test.

An uncoated slate board was used as comparative example.

Upon completion of the test, a vast number of hard-shell mussels, barnacles and algae had deposited on the uncoated slate board. The surface thereof was completely covered with these marine organisms. Slight algae-like deposition was observed on all of the boards coated with the mixed products comprising the kneaded products of the polymer of the present invention, an oligomer having carboxyl group and an inorganic copper compound. However, no deposition of shells was observed thereon.

What is claimed is:

1. Stainproofing paint composition comprising:
   (A) 100 parts by weight of a polymer having an acetoacetyl group, wherein the main chain of said polymer is carbon-carbon bond; and
   (B) 10 to 200 parts by weight of an inorganic copper compound and/or copper.

2. The stainproofing paint composition claimed in claim 1, wherein the polymer having an acetoacetyl group is obtained by copolymerizing
   (1) a monomer having an acetoacetyl group, and
   (2) 1 to 80 mol % of at least one monomer being copolymerizable with the above monomer and which forms a water-insoluble polymer.

3. The stainproofing paint composition claimed in claim 1, wherein the polymer having an acetoacetyl group is obtained by copolymerizing
   (1) a monomer having an acetoacetyl group, and
   (2) 1 to 70 mol % of a water-soluble monomer, in combination or not in combination with
   (3) a water-insoluble monomer.

4. The stainproofing paint composition claimed in claim 1, further containing a gelation stabilizing amount of a resin or a fatty acid having a molecular weight less than 3,000 and containing one carboxyl group within the molecule.

5. The stainproofing paint composition claimed in claim 1, wherein (B) is selected from the group consisting of cuprous oxide, basic copper chloride, basic copper sulfate, copper carbonate, basic copper carbonate, basic copper phosphate, copper hydroxide, copper silicate and mixtures thereof.

6. The stainproofing paint composition claimed in claim 1, wherein (B) is cuprous oxide.

7. The stainproofing paint composition claimed in claim 1, wherein (B) is a mixture of copper and cuprous oxide.

8. The stainproofing paint composition claimed in claim 1, wherein (B) is a mixture of copper, cuprous oxide and copper carbonate.

9. The stainproofing paint composition claimed in claim 1, wherein the number average molecular weight of polymer (A) is 5,000 to 100,000.

10. Method for preparing a stainproofing paint composition, comprising preliminarily mixing
(a) 10 to 200 parts by weight of an inorganic copper compound and/or copper, and
(b) a gelation stabilizing amount of a resin or a fatty acid, having a molecular weight of less than 3,000 and containing one carboxyl group within the molecule, and subsequently adding (c) 100 parts by weight, based on (a), of a polymer having an acetoacetyl group to the resulting mixture, wherein the main chain of said polymer is carbon-carbon bond.

* * * * *